(12) United States Patent
Beaucoup et al.

(10) Patent No.: US 7,724,891 B2
(45) Date of Patent: May 25, 2010

(54) METHOD TO REDUCE ACOUSTIC COUPLING IN AUDIO CONFERENCING SYSTEMS

(75) Inventors: Franck Beaucoup, Ottawa (CA); Michael Tetelbaum, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1641 days.

(21) Appl. No.: 10/896,444

(22) Filed: Jul. 22, 2004

(65) Prior Publication Data

US 2005/0018836 A1 Jan. 27, 2005

(30) Foreign Application Priority Data

Jul. 23, 2003 (GB) .................... 0317158.4

(51) Int. Cl.
*H04M 9/08* (2006.01)
(52) U.S. Cl. ................................. 379/406.02
(58) Field of Classification Search ............. 379/406.02
See application file for complete search history.

(56) References Cited

U.S. PATENT DOCUMENTS

| | | | |
|---|---|---|---|
| 4,485,272 A | 11/1984 | Duong et al. | |
| 5,963,901 A | 10/1999 | Vahatalo et al. | |
| 6,449,593 B1 * | 9/2002 | Valve | 704/233 |
| 6,453,041 B1 | 9/2002 | Eryilmaz | |
| 6,535,610 B1 | 3/2003 | Stewart | |
| 6,990,193 B2 | 1/2006 | Beaucoup et al. | |

FOREIGN PATENT DOCUMENTS

| | | |
|---|---|---|
| EP | 1 195 978 | 4/2002 |
| JP | 110 18193 | 1/1999 |

OTHER PUBLICATIONS

Kellermann, W., "Strategies for Combining Acoustic Echo Cancellation and Adaptive Beamforming Microphone Arrays" IEEE 1997; pp. 219-222, Fachhochschule Regensburg, Germany.

Chu, P., "Desktop Mic Array for Teleconferencing" IEEE 1995; pp. 2999-3002, 0-7803-2431-5/95.

Van Veen, B. et al., "Beamforming: A Versatile Approach to Spatial Filtering" IEEE ASSP Magazine Apr. 1988; pp. 4-24.

Kates, J. et al., "A Comparison of Hearing-aid Array-processing Techniques" J. Acoust. Soc. Am vol. 99 May 1996; pp. 3138-3148.

Gilbert, E. et al., "Optimum Design of Directive Antenna Arrays Subject to Random Variations" Bell System Technal Journal; May 1955; pp. 637-663.

(Continued)

*Primary Examiner*—Alexander Jamal

(57) ABSTRACT

A method to reduce acoustic coupling in an audio conferencing system having a loudspeaker and a plurality of microphones, comprising detecting the presence of one of either a source of near-end signal or a source of far-end signal source relative to the audio conferencing system, and in the event of detecting a source of near-end signal then processing the near-end signal with high directivity towards the near-end source, and in the event of detecting a source of far-end signal or double-talk then processing the far-end signal with high coupling characteristics between the loudspeaker and microphones.

9 Claims, 5 Drawing Sheets

Effect of interference nulling on directivity

OTHER PUBLICATIONS

Buchner, H. et al., "An Efficient Combination of Multi-channel Acoustic Echo Cancellation with a Beamforming Microphone Array" Int'l Workshop on Hands-Free Communication Apr. 2001 Kyoto, Japan pp. 55-58.

Brandstein M. et al., "Microphone Arrays: Signal Processing Techniques and Applications" 2001, pp. 19-38 & 281-306; Chapters 2 & 13; Springer-Verlag; Germany.

European Search Report from corresponding European Application No. EP 04 25 4345, Aug. 13, 2007.

Kellermann, W. "Strategies for combining acoustic echo cancellation and adaptive beamforming microphone arrays", Acoustics, Speech and Signal Processing, 1997 IEEE International Conference on Munich, Germany Apr. 21-24, 1997, Los Alamitos, CA, USA, IEEE Comput. Soc, US, vol. 1, Apr. 21, 1997, pp. 219-222, XP010226174, ISBN: 0-8186-7919-0.

Yensen, T. et al., "Synthetic stereo acoustic echo cancellation structure with microphone array beamforming for VOIP conferences", Acoustics, Speech, and Signal Processing, 2000. ICASSP '00. Proceedings. 2000 IEEE International Conference on Jun. 5-9, 2000, Poscataway, NJ, USA, IEEE, vol. 2, Jun. 5, 2000, pp. 817-820, XP010504848, ISBN: 0-7803-6293-4.

* cited by examiner

Effect of regulation on directivity

Effect of regularization on perturbed coupling

Effect of interference nulling on directivity

METHOD TO REDUCE ACOUSTIC COUPLING IN AUDIO CONFERENCING SYSTEMS

BACKGROUND OF THE INVENTION

1. Field of the Invention

The present invention is directed to audio conferencing systems, and more particularly to a method of reducing acoustic coupling and howling effects in a full duplex audio conferencing system using beamforming.

2. Description of the Related Art

Beamforming technology (also known as microphone array technology) can be used for spatial directivity of sound pickup in a conferencing system to enhance the quality of near-end speech. For such systems that perform full-duplex communications, acoustic echo cancellation presents numerous challenges.

One problem that is well known in the art relates to combining acoustic echo cancellation with beamforming (see M. Brandstein and D. Ward, "Microphone Arrays. Signal Processing Techniques and Applications". Springer Verlag, 2001, and H. Buchner, W. Herbordt, W. Kellermann, "*An Efficient Combination of Multi-Channel Acoustic Echo Cancellation With a Beamforming Microphone Array*", Proc. Int. Workshop on Hands-Free Speech Communication (HSC), pp. 55-58, Kyoto, Japan, April, 2001). One approach is to perform acoustic echo cancellation on all the microphone signals in parallel, which is computationally intensive. A second approach is to perform acoustic echo cancellation on the spatially filtered signal at the output of the beamformer.

In the approach where acoustic echo cancellation is performed on the spatially filtered signal at the output of the beamformer, it is clearly desirable that the beamformer presents good loudspeaker-to-beam coupling characteristics in order to minimize the amount of echo that has to be cancelled. At the same time, it is also desirable that the beamformer has good directivity in its look direction to provide enhanced speech quality based on spatial directivity. In practice, however, it is impossible to meet both of these requirements with the same beamformer design as there typically is a trade off between the beamformer's directivity and response to the loudspeaker signal, as discussed below.

A number of design requirements must be met to ensure good coupling characteristics. Firstly, the beamformer must be robust to uncorrelated perturbations of the microphone signals. The reason for this is that in a conference system, the physical coupling between the loudspeaker and the microphones is subject to variations caused by the loudspeaker and other structural vibrations or leakage. Therefore, a high sensitivity of the beamformer to such variations may result in excessive acoustic coupling between the loudspeaker and the output of the beam. This, in turn, affects the performance of the acoustic echo cancellation, resulting in echo bursts as well as howling effects due to positive loop gain. It should be noted that the sensitivity problem applies to both structures described above for combining acoustic echo cancellation with beamforming. Indeed, even if acoustic echo cancellation is performed on the microphone signals in parallel, the residual echo signals are not free of amplitude and phase variations due to structural coupling (vibrations and acoustical leaks). Many of these variations will remain on the microphone signals after the individual echo cancellation. When combined in the beamformer they may result in a large error signal if the beamformer is sensitive to the variations described above. The second design requirement that must be met to ensure good coupling characteristics is that the beamformer should also provide strong attenuation of the loudspeaker signal (which can be seen as an interference signal) in order to achieve better echo cancellation performance in the conferencing system.

BRIEF DESCRIPTION OF THE DRAWINGS

A further description of the prior art and of a preferred embodiment of the invention is set forth in detail below with reference to the following drawings, in which.

DISCUSSION OF THE BACKGROUND ART

Figure 1:
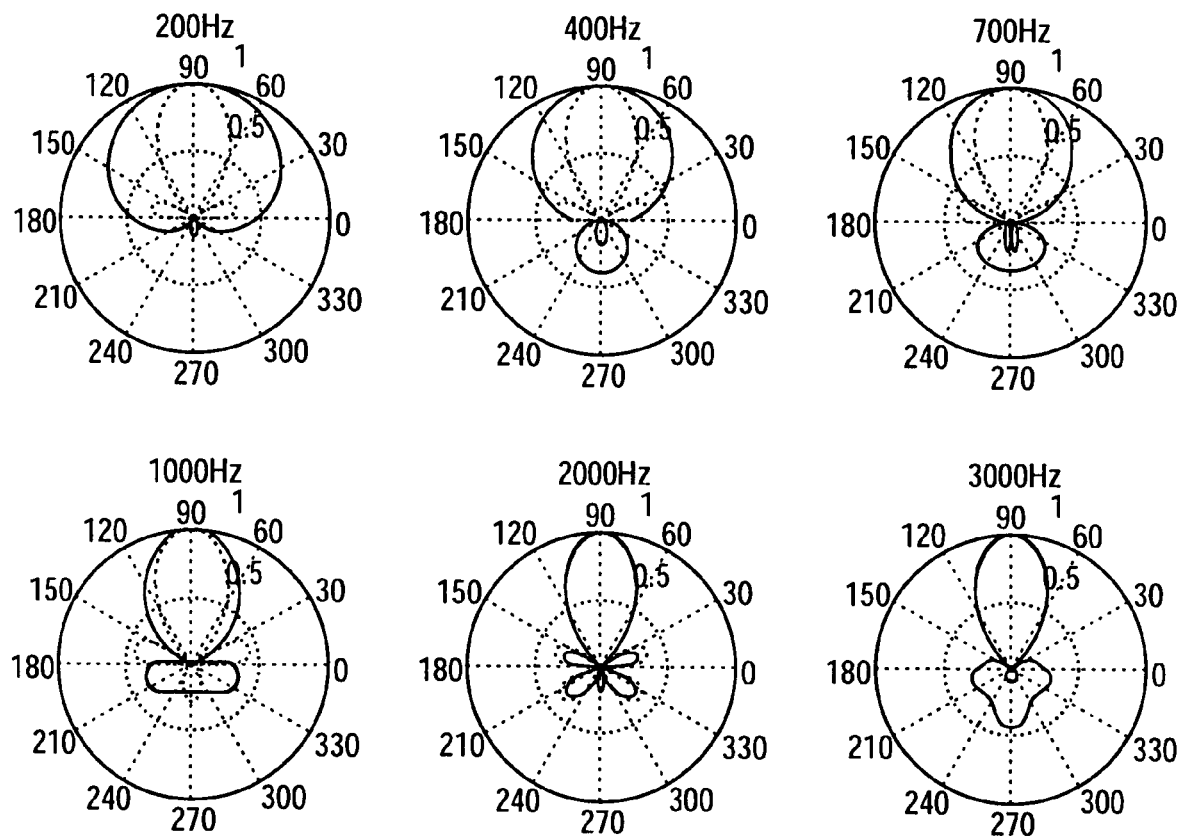
FIG. 1 shows a series of polar beampattern plots for a circular array of six microphones located around a diffracting structure with a loudspeaker located at the center, illustrating the effect of regularization in accordance with the prior art.
Figure 2:
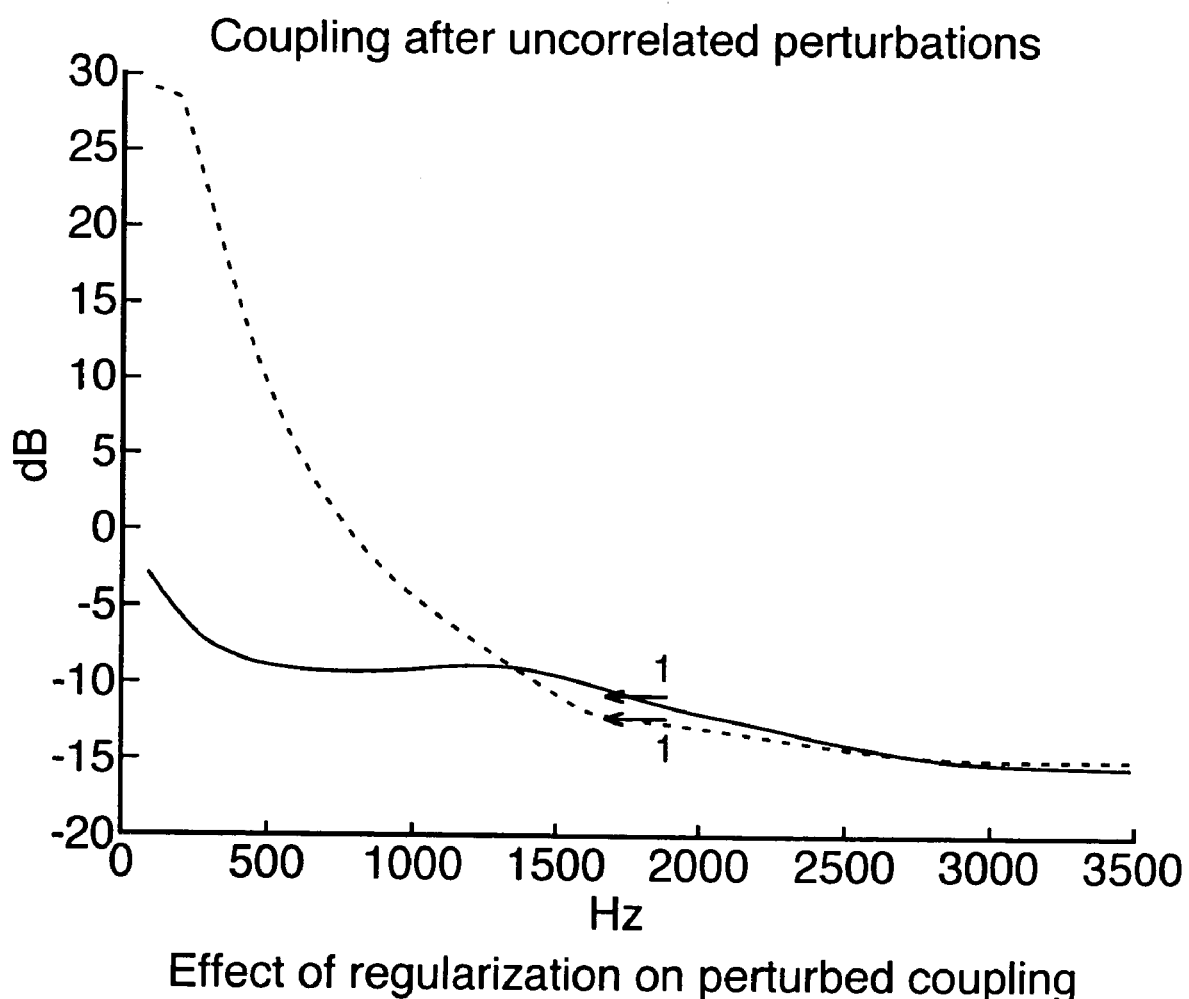
FIG. 2 is a graph showing the coupling response to the loudspeaker signal with random uncorrelated perturbations, for the circular array of six microphones located around a diffracting structure with a loudspeaker located at the center, in accordance with the prior art.

It is well known in the art (see Branstein et al, supra, chapter 2) that there is a trade-off between the directivity towards a talker and the robustness of the beamformer to amplitude and phase variations of the signals received by the microphones. In other words, very directive beamformers (designed with such methods as Minimum Variance Distortionless Response or other superdirective variants) are characterized by a high sensitivity to uncorrelated noise in the microphone signals. FIG. 1 illustrates this fact with a circular array of 6 microphones located around a diffracting structure with a loudspeaker located in the middle. The thick dashed line represents the beampattern of a standard minimum-variance distortionless (MVDR) beamformer with no special requirements for robustness whereas the thin line represents an MVDR beamformer designed for robustness (using a strong regularization factor as explained below). It can be seen that the beamformer designed for robustness presents a less directive beampattern. FIG. 2 shows the effect of the robustness on the coupling response when random uncorrelated perturbations (of a maximum of 5 dB in magnitude and 20 degrees in phase in this particular case) are added to the signals received at the microphones in response to the loudspeaker signal. The line definitions are the same as for FIG. 1. It can be seen that the more directive and less robust beamformer shows a very strong perturbed coupling response that would present serious challenges for the acoustic echo canceller in a practical conference system.

The general problem of achieving directivity and robustness is well-known in the art and several solutions have been proposed. All of them achieve a compromise between directivity and robustness, by introducing a regularization factor in the design of the beamformer (see for instance E. N. Gilbert and S. P. Morgan, "Optimum design of directive antenna arrays subject to random variations", Bell Syst. Tech. J., pp 637-663, May 1955). This regularization factor can vary between 0 and +∝. When given the value 0, the design results in a pure, superdirective beamformer (with high sensitivity). When given a value that tends to +∝, the design then yields the so-called conventional beamformer (also referred to as a delay-and-sum beamformer, or the Barlett beamformer (see Brandstein et al, supra, chapter 2), which is very robust but not very directive. Any value of the regularization factor between these two extremes represents a compromise between directivity and robustness. The process to find the best compromise for a particular device and a particular application is sometimes a trial-and-error process as in M. Doerbecker, "Mehrkanalige Signalverarbeitung zur verbesserung akustisch gestorter sprachsignale am beispiel elektronischer hörhilfen", PhD thesis, Dept of Telecommunications, University of TH Aachen, Verlag der Augustinus Buchhandlung, Aachen, Germany, August 1998. It is sometimes an iterative process as in J. M. Kates and M. R. Weiss, "A comparison of hearing-aid array-processing techniques", J. Acoustic. Soc. Amer., vol. 99, pp 3138-3148, May 1996. All these solutions achieve a trade off between directivity and coupling of the beamformer thus compromising the overall performance of the conferencing system.

Figure 3:
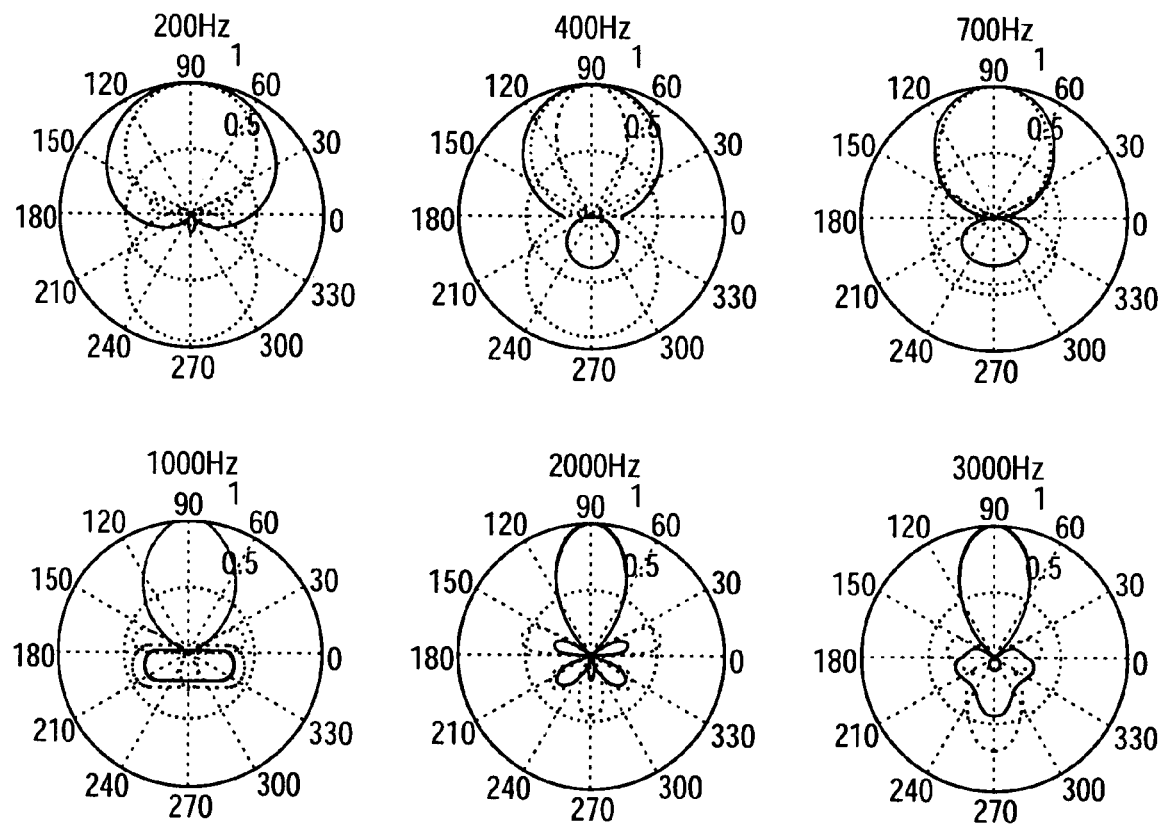
FIG. 3 shows a series of polar beampattern plots for a circular array of six microphones located around a diffracting structure with a loudspeaker located at the center after placing a null in the direction of an interference signal, in accordance with the prior art.
Figure 4:
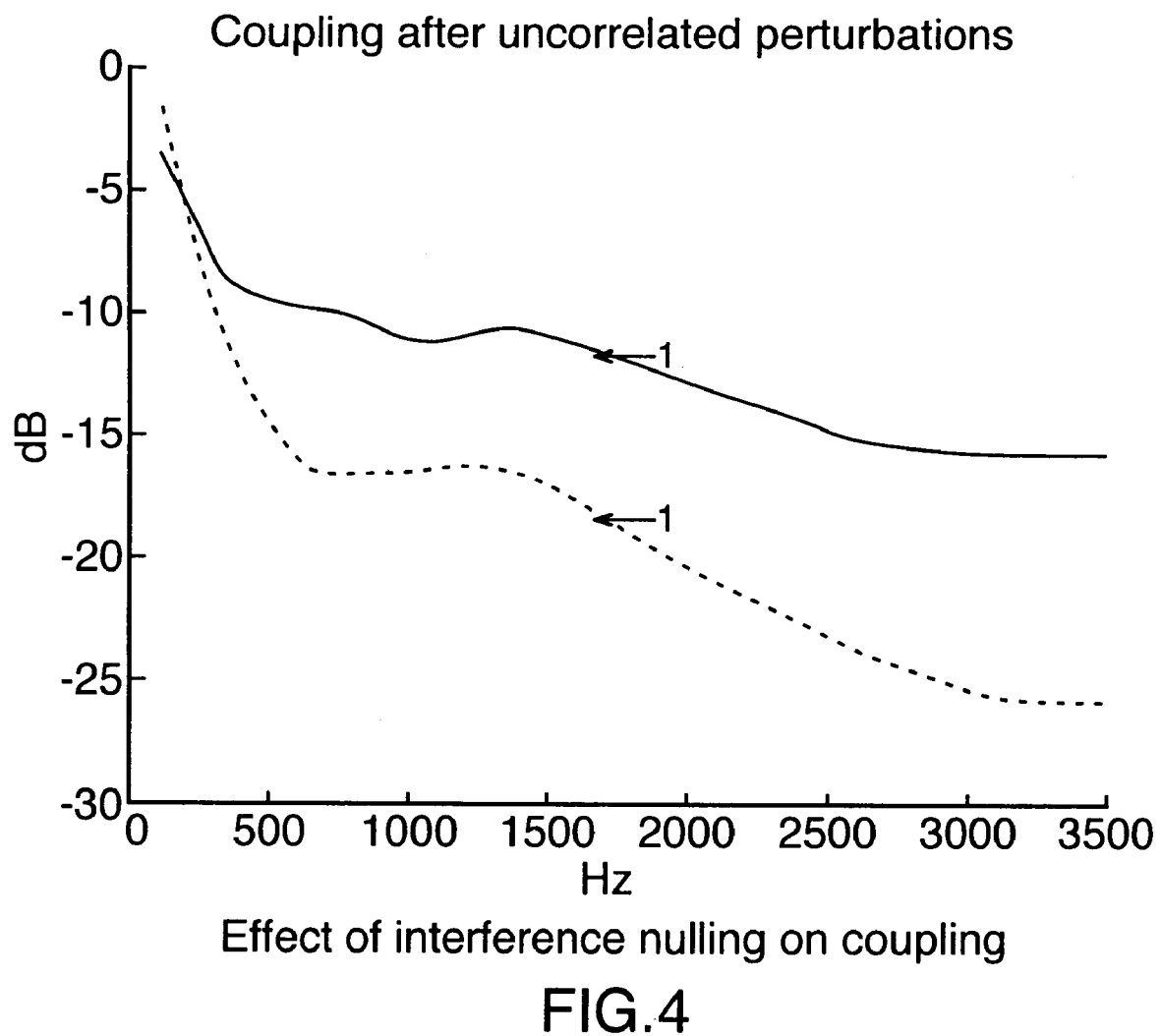
FIG. 4 is a graph showing the coupling response to the perturbed loudspeaker signal after nulling, for the circular array of six microphones located around a diffracting structure with a loudspeaker located at the center, in accordance with the prior art.

The second design requirement mentioned above may be referred to as interference nulling. It can be achieved with standard linear-constraint techniques as described in Van Veen and Buckley, "Beamforming: a versatile approach to spatial filtering", IEEE ASSP Magazine, April 1998. However, it is known in the art that placing a null (or strong attenuation) in the direction of an interference signal may also significantly affect the beamformer directivity in other directions because it reduces the number of degrees of freedom available to form a beam in its look direction. FIG. 3 illustrates this fact with the same array as discussed above in connection with FIGS. 1 and 2. The thin line represents a beampattern of a standard MVDR beamformer whereas the thick dashed line represents the MVDR beamformer with an additional linear constraint designed to place a null in the direction of the loudspeaker signal. Both beamformers have been designed with the same regularization factor. It can be seen that the interference nulling affects the directivity in a significant manner. FIG. 4 illustrates the effect of this interference nulling on the coupling response when random uncorrelated perturbations (of a maximum of 5 dB in magnitude and 20 degrees in phase as in FIG. 2) are added to the signals received at the microphones in response to the loudspeaker signal. The line definitions are the same as for FIG. 3. It can be seen that the perturbed coupling response is indeed reduced over most of the frequency range.

SUMMARY OF THE INVENTION

The inventors have realized that for the particular application of audio conferencing, the beamformer does not require good coupling characteristics and good near-end directivity at the same time. Moreover, the conferencing device has internal knowledge of which beamformer feature is more important at any given point in time (depending on the dynamics of the conversation: far-end speech, near-end speech, etc). More specifically, the inventors have recognized that an audio conferencing system only requires spatial directivity in the presence of near-end speech, and it only requires good coupling characteristics in the presence of far-end speech. Therefore, the key technical aspect of the present invention is to use two different beamformers: one with good coupling characteristics for far-end-speech (including double-talk) and one with good directivity towards the near-end speaker, for near-end speech. Double-silence can be handled with one or the other scheme the choice between which is an implementation decision, based on the specific characteristics of the particular device.

According to the foregoing, there is no need to compromise between directivity and coupling characteristics in the same beamformer design. The resulting system provides enhanced near-end speech quality (reverberations and local interference are suppressed by the "near-end" directional beamformer) as well as enhanced full-duplex operation (loudspeaker feedback is reduced by the "far-end" beamformer that is used in the presence of far-end signal or double-talk).

The present invention is to be distinguished from half-duplex echo cancellation, wherein the transmit channel is closed during far-end speech activity and partially closed during double-silence. In the present invention, both sound pickup schemes can be designed to provide a similar gain and frequency response towards the near-end talker. The resulting audio conferencing system therefore provides true full-duplex communication, and switching between the two sound-pickup schemes is much less noticeable for the far-end listener than it is with a half-duplex system. Furthermore, the full-duplex conferencing system benefits from maximal directivity when required (i.e. during near-end speech and possibly double-silence) as well as reduced loudspeaker-to-beam coupling performance when required (i.e. during far-end speech, double-talk and possibly double-silence).

The present invention relies on a good mechanism to detect the presence of near-end speech and/or far-end speech, This mechanism is not part of the present invention but would be well known to a person of ordinary skill in the art. In general, such a mechanism is available in conventional full-duplex acoustic echo cancellation algorithms that operate based on reliable decision logic regarding silence, single-talk and double-talk situations. Examples of such standalone mechanisms are set forth in U.S. Pat. No. 6,453,041 (Voice activity detection system and method, Erol Eryilmaz), and U.S. Pat. No. 5,963,901 (Method and device for voice activity detection in a communication device, Vahatalo et al).

DETAILED DESCRIPTION OF THE PREFERRED EMBODIMENT

Figure 5:
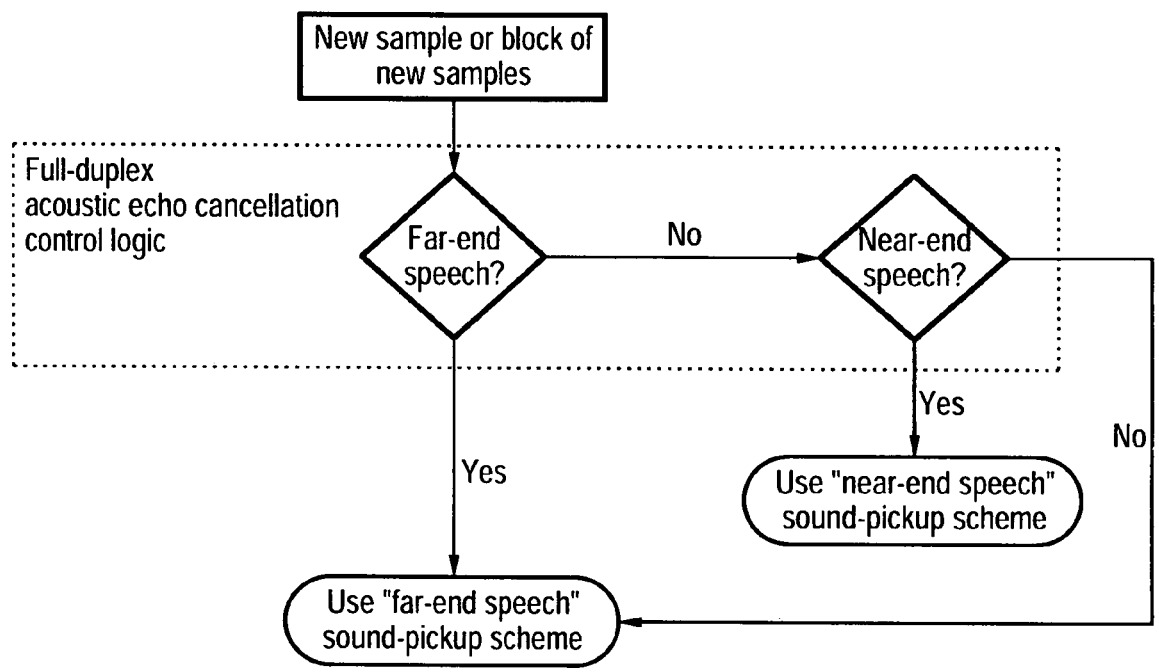
FIG. 5 is a flowchart showing steps in the method according to the present invention for reducing audio coupling in an audio conferencing system.

FIG. 5 is a flowchart of the method steps according to the present invention. Upon receipt of a new sample or block of samples, the full-duplex acoustic echo cancellation control logic detects between near-end speech and far-end speech and outputs the results of its detection (i.e. far-end speech detected, near-end speech detected or near-end speech not detected). In the event that far-end speech is detected, the far-end speech sound-pickup scheme is used. That is, a beamformer is switched in to process the signal samples with good coupling characteristics for far-end-speech, double-silence and double-talk. In the event that near-end speech is detected, the near-end speech sound-pickup scheme is used. That is, a beamformer is switched in to process the signal samples with good directivity towards the near-end speaker. Similarly, if neither far-end nor near-end speech is detected, then the far-end speech sound-pickup scheme is used. As mentioned above, an alternative implementation is to use the near-end speech sound-pickup scheme for double-silence as well as for near-end speech.

Preferably, switching between the two sound pickup schemes is gradual rather than instantaneous. In particular, in the case where double-silence is handled by the "far-end speech" sound pickup scheme, when near-end speech starts or resumes in the near-end location, the system preferably switches gradually from the "far-end speech" sound-pickup scheme to the "near-end speech" sound pickup scheme. This results in a gradual audio focus towards the near-end talker. The speed of the transitions from one beamformer to the other may depend on the properties of the two sound pickup schemes used, as will be apparent to a person of ordinary skill in the art.

The design of the two sound-pickup schemes utilize standard beamforming techniques available in the literature (see Brandstein et al, supra). Generally, the design requirements are as follows. The "far-end" beam needs good coupling response to the loudspeaker signal (e.g. standard linear-constraint techniques combined with standard regularisation techniques to ensure good robustness). The "near-end" beam needs good spatial directivity towards its look direction in order to deliver enhanced speech quality to the far-end party. To minimize transition effects, both beams should present similar gain and frequency response in the look direction of interest.

Alternatives and variations of the invention are possible. For example, the two sound-pickup schemes do not specifically need to be beamformers, but can be any sound pickup schemes that provide spatial directivity in one case and coupling performance in the other case, while both offering full gain towards the near-end talker.

Another variation is to use a different "far-end" sound pickup scheme for each look direction instead of a single "far-end" beam common to all directions. The "far-end" sound pickup schemes would then have to present good coupling characteristics and some directivity towards their look directions. This approach solves the problem of compromise between coupling and directivity, but it does not solve the problem of having to deal with acoustic echo cancellation on a signal with time varying echo path, as discussed above.

The many features and advantages of the invention are apparent from the detailed specification and, thus, it is intended by the appended claims to cover all such features and advantages of the invention that fall within the sphere and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to reduce acoustic coupling in a full-duplex audio conferencing system having a loudspeaker signal and a plurality of microphones, the method comprising:
   detecting the presence of one of either a near-end speech or a far-end speech by full-duplex acoustic echo cancellation control logic;
   in the event of detecting the near-end speech, employing a first beamformer to process the near-end speech, the first beamformer designed with good directivity towards the near-end speech; and
   in the event of detecting the far-end speech, employing a second beamformer to process the far-end speech, the second beamformer designed to place a null in a direction of the loudspeaker signal.

2. method of claim 1, further including gradually switching between the first and second beamformers.

3. The method of claim 1, further comprising detecting the presence of double-talk and employing the second beamformer to process the far-end speech.

4. The method of claim 1, wherein the first and second beamformers are designed to provide similar gain and frequency response towards the near-end speech.

5. A full-duplex audio conferencing system comprising:
   a loudspeaker configured to acoustically transmit a signal comprising a far-end speech;
   a plurality of microphones configured to acoustically receive a near-end speech;
   a full-duplex acoustic echo canceller configured to detect the presence of one of either the near-end speech or the far-end speech;
   a first beamformer to process the near-end speech and configured to have good directivity towards the near-end speech; and
   a second beamformer to process the far-end speech and configured to place a null in the direction of the loudspeaker signal,
   wherein, a switch occurs between the first and second beamformers depending upon which speech is detected.

6. The system of claim 5, wherein the switch occurs gradually.

7. The system of claim 5, wherein the first and second beamformers are designed to provide similar gain and frequency response towards the near-end speech.

8. The system of claim 5, wherein the echo canceller is further configured to detect the presence of double-talk and the second beamformer is used.

9. A method to reduce acoustic coupling in a full-duplex audio conferencing system having a loudspeaker signal and a plurality of microphones, the method comprising:
   detecting the presence of one of either a near-end speech or a far-end speech by full-duplex acoustic echo cancellation control logic;
   in the event of detecting the near-end speech, employing a first beamformer to process the near-end speech, the first beamformer adapted for spatial directivity in the direction of near-end speech; and
   in the event of detecting the far-end speech, employing a second beamformer to process the far-end speech, the second beamformer adapted to provide strong attenuation of the loudspeaker signal.

* * * * *